(12) United States Patent
Uhr et al.

(10) Patent No.: US 10,594,498 B2
(45) Date of Patent: *Mar. 17, 2020

(54) METHOD AND SERVICE-PROVIDING SERVER FOR SECURE TRANSMISSION OF USER-AUTHENTICATING INFORMATION

(71) Applicant: Coinplug, Inc., Seongnam-si (KR)

(72) Inventors: Joon Sun Uhr, Seongnam-si (KR); Jay Wu Hong, Seoul (KR); Joo Han Song, Seongnam-si (KR)

(73) Assignee: Coinplug, Inc., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/419,009

(22) Filed: May 22, 2019

(65) Prior Publication Data

US 2019/0296920 A1 Sep. 26, 2019

Related U.S. Application Data

(63) Continuation of application No. 16/027,055, filed on Jul. 3, 2018, now Pat. No. 10,333,721, which is a
(Continued)

(30) Foreign Application Priority Data

Jan. 5, 2016 (KR) .................... 10-2016-0000729

(51) Int. Cl.
*H04L 12/06* (2006.01)
*H04L 29/06* (2006.01)
(Continued)

(52) U.S. Cl.
CPC ............ *H04L 12/06* (2013.01); *H04L 9/0861* (2013.01); *H04L 9/30* (2013.01); *H04L 9/32* (2013.01);
(Continued)

(58) Field of Classification Search
CPC ....... H04L 12/06; H04L 9/30; H04L 63/0853; H04L 9/3226; H04L 63/0428;
(Continued)

(56) References Cited

U.S. PATENT DOCUMENTS

2003/0055894 A1 3/2003 Yeager et al.
2003/0056094 A1 3/2003 Huitema et al.
(Continued)

FOREIGN PATENT DOCUMENTS

KR 10-0344114 B1 7/2002
KR 10-2011-0078146 A 7/2011
(Continued)

OTHER PUBLICATIONS

International Search Report and Written Opinion for PCT/KR2016/007468 dated Oct. 31, 2016.

*Primary Examiner* — Meng Li
(74) *Attorney, Agent, or Firm* — Xsensus, LLP

(57) ABSTRACT

A method for secure transmission of user-authenticating information is provided. The method includes steps of: a service-providing server (a) determining whether a public key of the user is registered in a blockchain network, and instructing a user-authenticating information generator to generate user-authenticating information for reference, instructing an encrypting engine to encrypt the generated user-authenticating information for reference by using the public key of the user retrieved from the blockchain network, and instructing a message-sending part to transmit the encrypted user-authenticating information for reference to a mobile device of the user; and (b) in case that user-authenticating information for comparison is acquired from the user device and if the user-authenticating information for comparison is determined as identical to the user-authenti-
(Continued)

cating information for reference, providing the user device with the service desired by the user.

10 Claims, 7 Drawing Sheets

Related U.S. Application Data continuation of application No. PCT/KR2016/007468, filed on Jul. 11, 2016.

(51) Int. Cl.
| | |
|---|---|
| *H04W 12/04* | (2009.01) |
| *H04W 12/06* | (2009.01) |
| *H04W 12/08* | (2009.01) |
| *H04L 9/08* | (2006.01) |
| *H04L 9/32* | (2006.01) |
| *H04L 9/30* | (2006.01) |
| *H04L 12/04* | (2006.01) |
| *H04L 12/08* | (2006.01) |

(52) U.S. Cl.
CPC .......... *H04L 9/3226* (2013.01); *H04L 9/3236* (2013.01); *H04L 12/04* (2013.01); *H04L 12/08* (2013.01); *H04L 63/0428* (2013.01); *H04L 63/0853* (2013.01); *H04L 63/18* (2013.01); *H04W 12/04* (2013.01); *H04W 12/06* (2013.01); *H04W 12/08* (2013.01); *H04L 2209/38* (2013.01); *H04L 2209/56* (2013.01); *H04L 2209/80* (2013.01); *H04L 2463/082* (2013.01)

(58) Field of Classification Search
CPC ..... H04L 9/0861; H04L 9/3236; H04L 63/18; H04L 12/04; H04L 12/08; H04L 2463/082; H04L 2209/56; H04L 2209/38; H04L 2209/80; H04W 12/04; H04W 12/06; H04W 12/08
See application file for complete search history.

(56) References Cited

U.S. PATENT DOCUMENTS

| | | |
|---|---|---|
| 2006/0004789 A1 | 1/2006 | Lunt et al. |
| 2010/0093310 A1 | 4/2010 | Gbadegesin et al. |
| 2010/0211795 A1 | 8/2010 | Brown et al. |
| 2011/0035677 A1 | 2/2011 | Vitale et al. |
| 2011/0319058 A1 | 12/2011 | Ankolekar et al. |
| 2014/0052993 A1* | 2/2014 | Isozaki ............... H04L 63/0428 713/175 |
| 2015/0019869 A1 | 1/2015 | Walker et al. |
| 2017/0195299 A1* | 7/2017 | James ................ H04L 63/0442 |
| 2017/0223015 A1 | 8/2017 | Lee et al. |

FOREIGN PATENT DOCUMENTS

| | | |
|---|---|---|
| KR | 10-1358375 B1 | 2/2014 |
| KR | 10-1443849 B1 | 9/2014 |
| KR | 101443849 B1 * | 9/2014 |
| KR | 10-1451638 B1 | 10/2014 |
| KR | 2017015038 A | 2/2017 |
| KR | 2017015091 A | 2/2017 |
| KR | 2017030866 A | 3/2017 |
| KR | 2017141861 A | 12/2017 |

* cited by examiner

US 10,594,498 B2

METHOD AND SERVICE-PROVIDING SERVER FOR SECURE TRANSMISSION OF USER-AUTHENTICATING INFORMATION

CROSS-REFERENCE TO RELATED APPLICATIONS

This application is a continuation of U.S. application Ser. No. 16/027,055, filed Jul. 3, 2018, which is a bypass continuation of International Patent Application No. PCT/KR2016/007468, filed Jul. 11, 2016, claiming priority to Korean Patent Application No. 10-2016-0000729, filed Jan. 5, 2016, the entire contents of each are incorporated herein by reference.

FIELD OF THE DISCLOSURE

The present disclosure relates to a method for secure transmission of user-authenticating information; and more particularly, to the method for the secure transmission of the user-authenticating information using a blockchain network, and a service-providing server using the same.

BACKGROUND OF THE DISCLOSURE

With the recent development of Internet communication technology, various functions utilizing mobile communication devices such as smart phones are being provided.

That is, as the data processing technology based on the wireless communications rapidly develops, people can use services like not only a voice communication but also a short message transmission, a video call, an electronic notebook, entertainment, Internet connection, and video message transmission.

Recently, a mobile device authentication service became popular which carries out identity authentication provided by a telecommunications company, a financial institution server, a portal site, etc. through a mobile communication network among various services utilizing a mobile device.

In the mobile device authentication service, when a user possessing a mobile device requests payment, information confirmation, registration, or information change all requiring authentication at a web site, an authentication number is transmitted to the mobile device having the pre-registered phone number of the user, and the user is authenticated by inputting the received authentication number through the web site. The mobile device authentication service is largely divided into two ways of authentication, one is possession authentication in which only the phone number is required for receiving the authentication number: the phone number is inputted, the authentication number is requested, then the authentication number is transmitted to the mobile device having the phone number, and the other is ownership authentication in which the phone number as well as an SSN is required: the phone number and the SSN are inputted, the authentication is performed using a DB of the telecommunications company by referring to the phone number and the SSN, then the authentication number is transmitted to the mobile device having the phone number.

However, the conventional mobile device authentication service has a problem because an unauthorized user can acquire the authentication number while its transmission from the server of the web site to the mobile device of the user through the mobile communication network, which may jeopardize financial services.

PRIOR ART

Cited Patent Literature

Cited Patent Literature 1: Korean Patent Registration No. 10-0344114 registered on Jun. 28, 2002

SUMMARY OF THE DISCLOSURE

It is an object of the present disclosure to solve all the aforementioned problems.

It is another object of the present disclosure to provide a system and a method for secure transmission of user-authenticating information which prevent an unauthorized user from recognizing the authentication number using encrypted authentication number which cannot be decrypted in case the encrypted authentication number is leaked due to hacking, by transmitting the authentication number encrypted with a public key of a user from a service-providing server to a mobile device of the user.

In accordance with one aspect of the present disclosure, there is provided a method for secure transmission of user-authenticating information, including steps of: (a) a service-providing server, if a service request for a service desired by a user is acquired from a user device, determining whether a public key of the user is registered in a blockchain network or supporting another device connected with the service-providing server to determine whether the public key of the user is registered in the blockchain network, and if the public key of the user is determined as registered in the blockchain network, instructing a user-authenticating information generator to generate user-authenticating information for reference, instructing an encrypting engine to encrypt the generated user-authenticating information for reference by using the public key of the user retrieved from the blockchain network, and instructing a message-sending part to transmit the encrypted user-authenticating information for reference to a mobile device of the user or supporting another device connected with the service-providing server to transmit the encrypted user-authenticating information for reference to the mobile device of the user; and (b) the service-providing server, in case that user-authenticating information for comparison is acquired from the user device, wherein the mobile device instructs a decrypting engine to decrypt the encrypted user-authenticating information for reference received from the service-providing server into decrypted information by using a private key of the user which has been stored beforehand, and displays the decrypted information, and then the user-authenticating information for comparison is inputted by the user via the user device after the user confirms the decrypted information displayed on the mobile device, and if the user-authenticating information for comparison is determined as identical to the user-authenticating information for reference, providing the user device with the service desired by the user who has sent the service request or supporting another device connected with the service-providing server to provide the user device with the service desired by the user who has sent the service request.

As one example, at the step of (a), the service-providing server, if the public key of the user is determined as not registered in the blockchain network, transmits a generation request for the public key of the user to the mobile device of the user, to thereby allow the mobile device of the user to generate the private key of the user and its corresponding public key of the user by way of a key-generating engine, allows the private key of the user to be stored in the mobile device and the public key of the user to be transmitted to the service-providing server, and if the public key of the user is acquired from the mobile device of the user, transmits the public key of the user to at least one blockchain node included in the blockchain network, to thereby instruct the at least one blockchain node to register the public key of the user in the blockchain network, and acquires a transaction ID for registration corresponding to the public key of the user registered in the blockchain network.

As one example, the service-providing server, if the public key of the user is acquired from the mobile device of the user, transmits the public key of the user and user identification information on the user to a key server, to thereby instruct the key server to (i) generate transaction information for registration to be used for registering the public key of the user in the blockchain network and its corresponding transaction ID for registration by way of a transaction-processing engine, (ii) match and manage the user identification information and the transaction ID for registration, and (iii) transmit the transaction information for registration to the at least one blockchain node, to thereby allow the transaction information for registration to be registered in the blockchain network.

As one example, at the step of (a), the service-providing server transmits a key request for the public key of the user, using the transaction ID for registration corresponding to the public key of the user registered in the blockchain network, to the at least one blockchain node included in the blockchain network, to thereby instruct the at least one blockchain node to transmit the public key of the user, which is registered in the blockchain network as corresponding to the transaction ID for registration, to the service-providing server.

As one example, the service-providing server transmits the user identification information, as the key request for the public key of the user, to the key server, to thereby instruct the key server to (i) transmit the transaction ID for registration, which is managed according to the user identification information, to the at least one blockchain node, to thereby acquire the transaction information for registration corresponding to the transaction ID for registration, and (ii) transmit the public key of the user included in the transaction information for registration to the service-providing server.

As one example, the user-authenticating information for reference includes numbers, characters, symbols, or any combination thereof.

As one example, at the step of (a), the service-providing server transmits the encrypted user-authenticating information for reference to the mobile device of the user by using a phone number corresponding to the user.

As one example, at the step of (a), the service-providing server determines whether the transaction ID for registration, acquired by registering the public key of the user in the blockchain network, is registered in a transaction database, to thereby determine whether the public key of the user is registered in the blockchain network.

In accordance with another aspect of the present disclosure, there is provided a service-providing server for secure transmission of user-authenticating information, including: at least one memory that stores instructions; and at least one processor configured to execute the instructions to perform processes of: (I) if a service request for a service desired by a user is acquired from a user device, determining whether a public key of the user is registered in a blockchain network or supporting another device connected with the service-providing server to determine whether the public key of the user is registered in the blockchain network, and if the public key of the user is determined as registered in the blockchain network, instructing a user-authenticating information generator to generate user-authenticating information for reference, instructing an encrypting engine to encrypt the generated user-authenticating information for reference by using the public key of the user retrieved from the blockchain network, and instructing a message-sending part to transmit the encrypted user-authenticating information for reference to a mobile device of the user or supporting another device connected with the service-providing server to transmit the encrypted user-authenticating information for reference to the mobile device of the user, and (II) in case that user-authenticating information for comparison is acquired from the user device, wherein the mobile device instructs a decrypting engine to decrypt the encrypted user-authenticating information for reference received from the service-providing server into decrypted information by using a private key of the user which has been stored beforehand, and displays the decrypted information, and then the user-authenticating information for comparison is inputted by the user via the user device after the user confirms the decrypted information displayed on the mobile device, and if the user-authenticating information for comparison is determined as identical to the user-authenticating information for reference, providing the user device with the service desired by the user who has sent the service request or supporting another device connected with the service-providing server to provide the user device with the service desired by the user who has sent the service request.

As one example, at the process of (I), the processor, if the public key of the user is determined as not registered in the blockchain network, transmits a generation request for the public key of the user to the mobile device of the user, to thereby allow the mobile device of the user to generate the private key of the user and its corresponding public key of the user by way of a key-generating engine, allows the private key of the user to be stored in the mobile device and the public key of the user to be transmitted to the service-providing server, and if the public key of the user is acquired from the mobile device of the user, transmits the public key of the user to at least one blockchain node included in the blockchain network, to thereby instruct the at least one blockchain node to register the public key of the user in the blockchain network, and acquires a transaction ID for registration corresponding to the public key of the user registered in the blockchain network.

As one example, the processor, if the public key of the user is acquired from the mobile device of the user, transmits the public key of the user and user identification information on the user to a key server, to thereby instruct the key server to (i) generate transaction information for registration to be used for registering the public key of the user in the blockchain network and its corresponding transaction ID for registration by way of a transaction-processing engine, (ii) match and manage the user identification information and the transaction ID for registration, and (iii) transmit the transaction information for registration to the at least one blockchain node, to thereby allow the transaction information for registration to be registered in the blockchain network.

As one example, at the process of (I), the processor transmits a key request for the public key of the user, using the transaction ID for registration corresponding to the public key of the user registered in the blockchain network, to the at least one blockchain node included in the blockchain network, to thereby instruct the at least one blockchain node to transmit the public key of the user, which is registered in the blockchain network as corresponding to the transaction ID for registration, to the service-providing server.

As one example, the processor transmits the user identification information, as the key request for the public key of the user, to the key server, to thereby instruct the key server to (i) transmit the transaction ID for registration, which is managed according to the user identification information, to the at least one blockchain node, to thereby acquire the transaction information for registration corresponding to the transaction ID for registration, and (ii) transmit the public key of the user included in the transaction information for registration to the service-providing server.

As one example, the user-authenticating information for reference includes numbers, characters, symbols, or any combination thereof.

As one example, at the process of (I), the processor transmits the encrypted user-authenticating information for reference to the mobile device of the user by using a phone number corresponding to the user.

As one example, at the process of (I), the processor determines whether the transaction ID for registration, acquired by registering the public key of the user in the blockchain network, is registered in a transaction database, to thereby determine whether the public key of the user is registered in the blockchain network.

BRIEF DESCRIPTION OF THE DRAWINGS

The above and other objects and features of the present disclosure will become apparent from the following description of preferred embodiments given in conjunction with the accompanying drawings, in which.

DETAILED DESCRIPTION OF THE PREFERRED EMBODIMENTS

Figure 1:
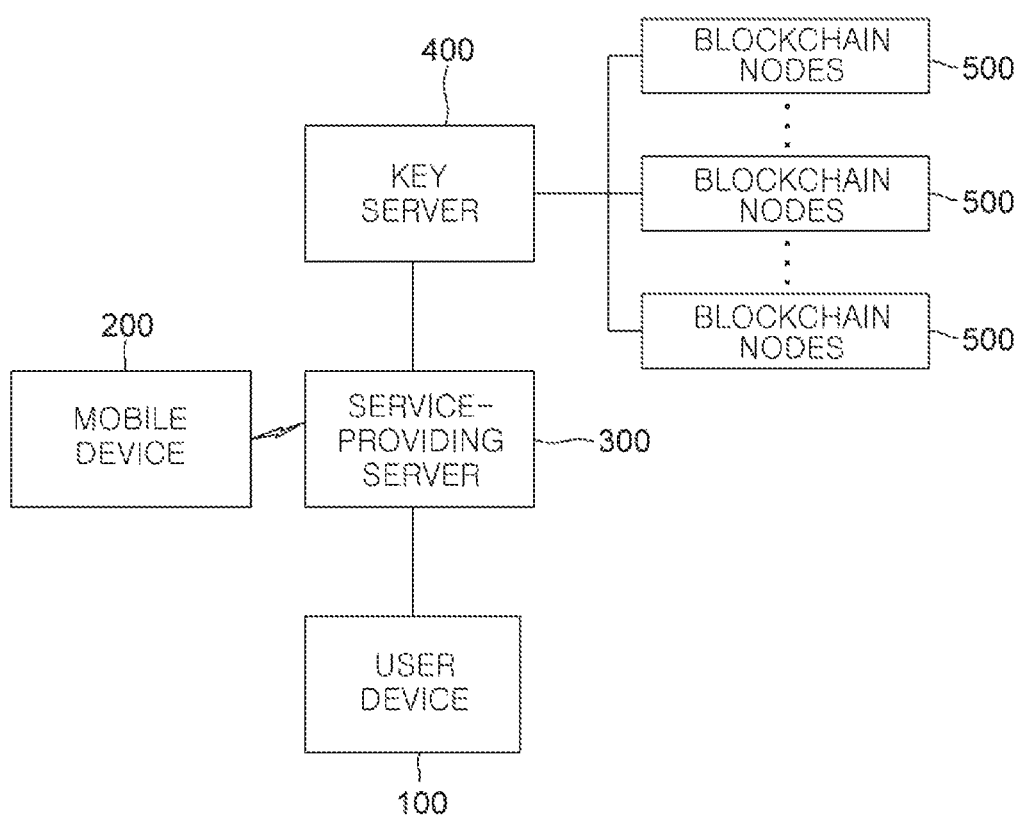
FIG. 1 is a block diagram illustrating a system for secure transmission of user-authenticating information in accordance with the present disclosure.
Figure 2:
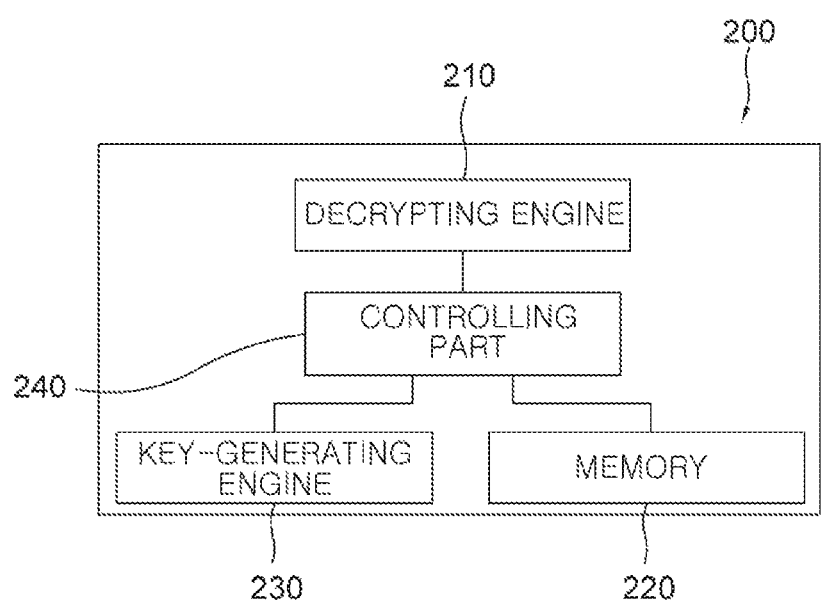
FIG. 2 is a block diagram illustrating a mobile device in a configuration of the system for secure transmission of user-authenticating information in accordance with the present disclosure.
Figure 3:
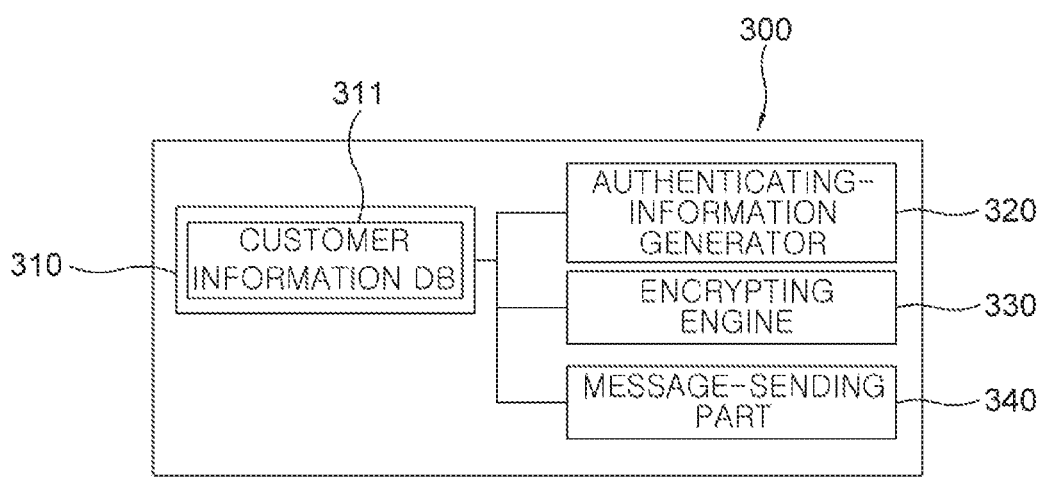
FIG. 3 is a block diagram illustrating a service-providing server in the configuration of the system for secure transmission of user-authenticating information in accordance with the present disclosure.
Figure 4:
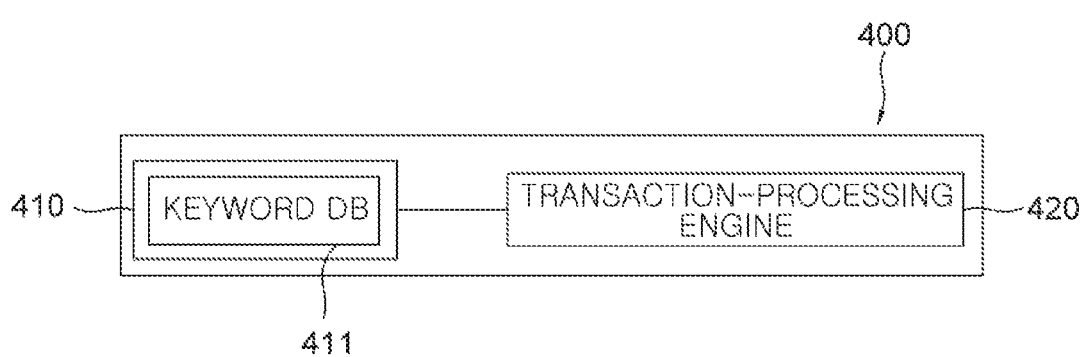
FIG. 4 is a block diagram illustrating a key server in the configuration of the system for secure transmission of user-authenticating information in accordance with the present disclosure.
Figure 5:
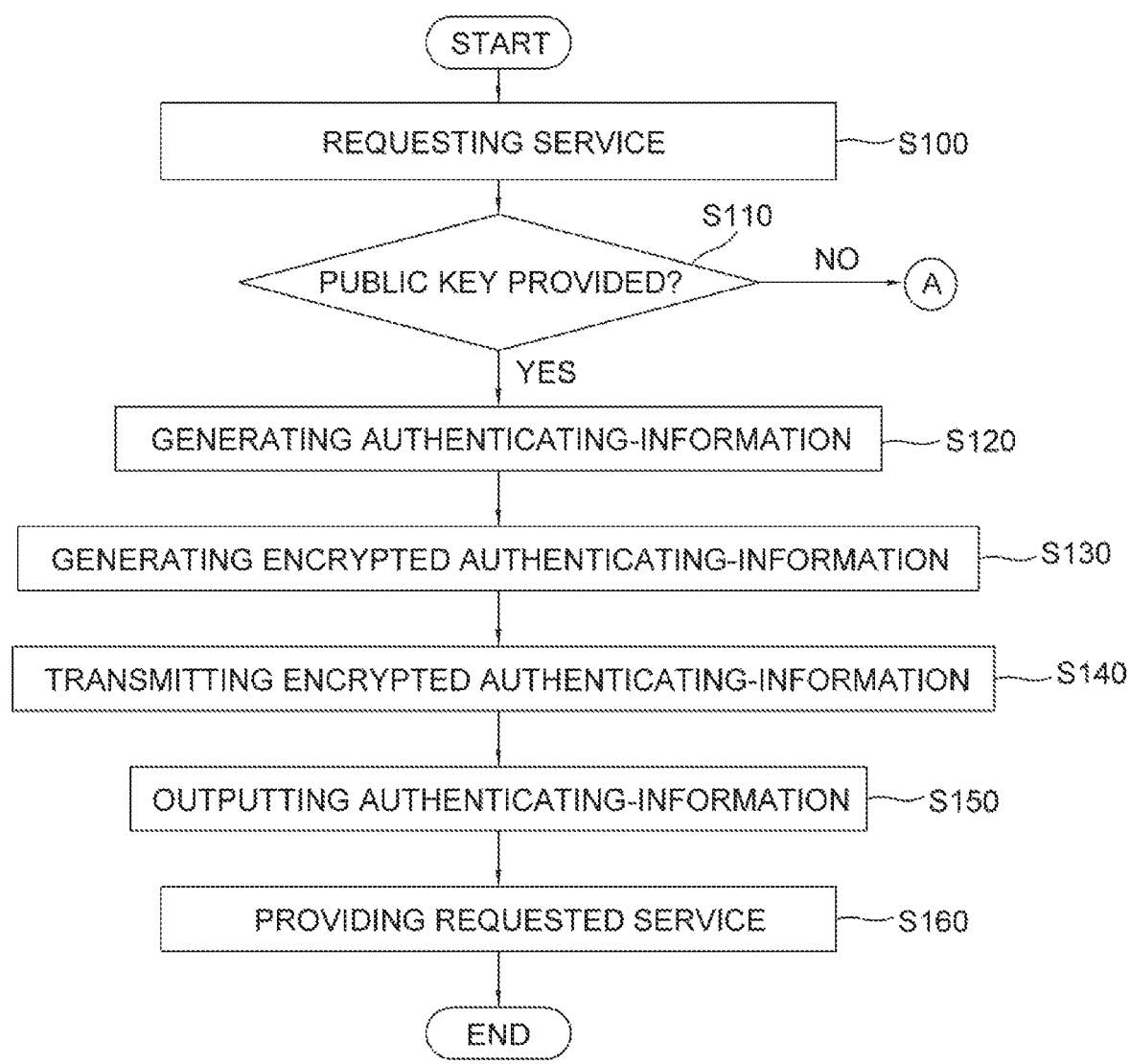
FIGS. 5 to 7 are flowcharts illustrating processes of encrypting and transmitting of the user-authenticating information in the system for secure transmission of user-authenticating information in accordance with the present disclosure.
Figure 6:
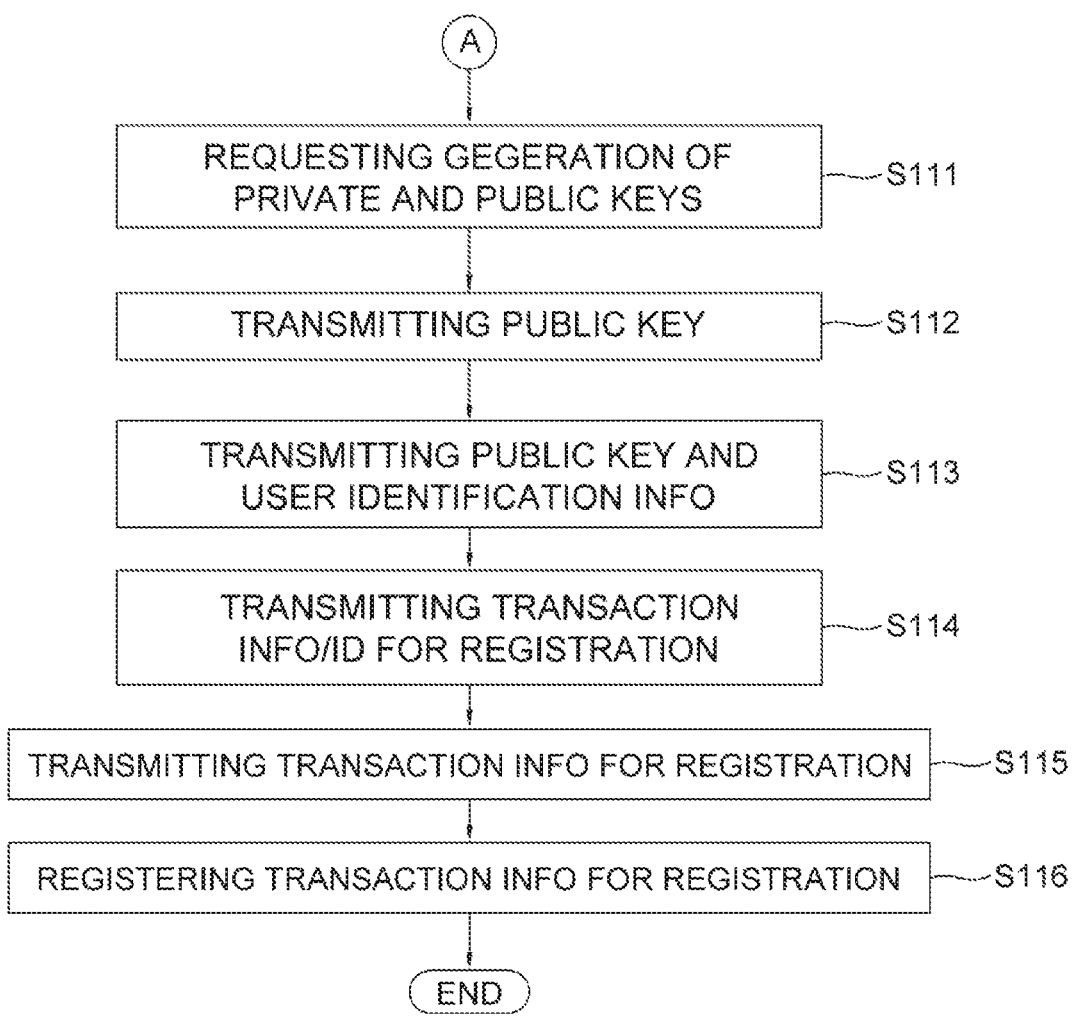
Figure 7:
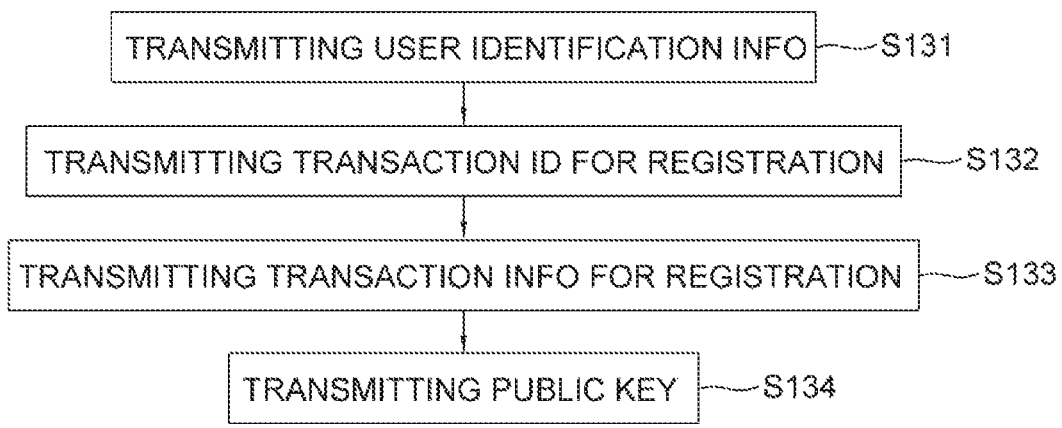

The embodiments below of the present disclosure will be described in sufficient detail by referring to attached drawings regarding configurations and effects of the embodiments. Throughout the present disclosure, every processor, every memory, every storage, or any other computing components are described as separate components, however, said every processor, said every memory, said every storage, or said any other computing components may be configured as a single device or any other combinations thereof. In the description below, the phrase "for reference" is added for terms related to objects or concepts to be used as references, and the phrase "for comparison" is added for terms related to objects or concepts that are presented or requested to be compared with the references, to avoid possible confusion. Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure. Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled.

As illustrated, a system for secure transmission of user-authenticating information in accordance with the present disclosure may include a user device 100, a mobile device 200, a service-providing server 300, a key server 400, and blockchain nodes 500. The service-providing server 300 may include a memory (not illustrated) for storing instructions to determine registration, transmit information, provide services, etc., and a processor (not illustrated) for performing processes to determine the registration, transmit the information, provide the services, etc. corresponding to the instructions in the memory (not illustrated).

First, the user device 100 may be a device requesting a service, e.g., payment service, information inquiry service, purchasing service, etc. among various services delivered by the service-providing server 300, with the user device logged-in to the service-providing server 300 to be described later, and may be connected with the service-providing server 300 through a network including the Internet.

The mobile device 200 may be owned by the user, and may be a device decrypting and outputting encrypted user-authenticating information if the encrypted user-authenticating information is received from a message-sending part 340 of the service-providing server 300 to be described later, and may be connected with the service-providing server 300 through a network including telecommunications network. Herein, the network including telecommunications network may include at least one of WiFi, wireless LAN network, and WCDMA network.

The mobile device 200 performing such functions may include a key-generating engine 230 which generates a public key of the user and a private key of the user, a memory 220 which stores the private key generated at the key-generating engine 230, a decrypting engine 210, and a controlling part 240 which controls the key-generating engine 230, the memory 220, and the decrypting engine 210.

Herein, the key-generating engine 230 and the decrypting engine 210 may be installed on the mobile device 200 in a form of a mobile-exclusive app provided by the service-providing server 300 to be described later.

If the key-generating engine 230 and the decrypting engine 210 are installed on the mobile device 200, the controlling part 240 may instruct the key-generating engine 230 to generate the public key and the private key, where the controlling part 240 of the mobile device 200 may allow the public key and the private key to be generated while the network is being disconnected, to prevent possible leakage of the keys.

Thereafter, the controlling part 240 may store the private key in the memory 220, and may transmit the public key to the service-providing server 300 to be described later.

Thereafter, the service-providing server 300 may store the public key transmitted from the mobile device 200 in a customer information DB 311 of a DB part 310.

Meanwhile, when the public key is stored in the customer information DB 311, it may be leaked or forged by hacking.

To prevent this, the present disclosure may store the public key required for encrypting an authentication number in a blockchain, not in a private server, may provide a function of serving the public key whenever it is needed, and for this purpose, may require the key server 400 and the blockchain nodes 500.

First, if the public key is received from the mobile device 200, the service-providing server 300 to be described later may retrieve user identification information on the user from the customer information DB 311, and may transmit the retrieved user identification information and the private key to the key server 400. Herein, the received public key is not stored in the customer information DB 311.

The key server 400 may include its DB part 410 having its keyword DB 411, and its transaction-processing engine 420.

If the private key and the user identification information are received from the service-providing server 300, the key server 400 may instruct its transaction-processing engine 420 to generate (i) transaction information for registration including the received public key, and (ii) a transaction ID for registration used as a key value for searching the transaction information for registration.

Thereafter, the transaction-processing engine 420 may transmit the transaction information for registration to the blockchain nodes 500 in order to register in the blockchain, and may store the transaction ID for registration and the user identification information in the keyword DB 411.

The blockchain nodes 500 may be devices composing a cryptocurrency network that performs cryptocurrency transactions, e.g., bitcoin transactions, by verifying and recording the transactions.

Herein, the bitcoin is briefly explained. Bitcoin is a digital currency capable of payment in kind made by Satoshi Nakamoto in 2009, and has a decentralized structure which does not have a central device that issues and manages the currency. Rather, the transactions of bitcoin are processed by a blockchain network based on a peer-to-peer, i.e., P2P, network and public key encryption.

Having a payment method as such, the bitcoin has advantages that payment is possible without using information required for credit card transactions such as card numbers, expiration dates, and CCV numbers, and that fees are inexpensive. Further, bitcoin is stored in a digital wallet which is an electronic file, and a unique address, i.e., a public address, is allocated to this digital wallet, and the bitcoin transactions are processed based on the address.

In order to use bitcoin with such transactional characteristics, first of all, a bitcoin user may sign in to a bitcoin exchange, e.g., www.coinplug.com, and make a digital wallet then load it with KRW, i.e., Korean Won.

Thereafter, after confirming a current exchange rate of bitcoin at the exchange, the bitcoin user may place a buying order including an amount and a unit price of bitcoin. If a selling order matching the buying order exists, then a transaction occurs and bitcoin is purchased, and the bitcoin user may pay with bitcoin for a product.

Such the blockchain nodes 500 may include a server managed by the bitcoin exchange, and may further include a server or a terminal operated by a bitcoin miner, or a user's terminal capable of Internet communications for bitcoin payment, e.g., a PC or a smart phone.

For this purpose, the respective blockchain nodes 500 may include digital wallets, and if transaction information for bitcoin payment created by the digital wallets according to a typical bitcoin payment is received, the blockchain nodes 500 may verify the received transaction information for bitcoin payment to authorize the bitcoin payment, and then the transaction information bitcoin payment may be recorded and broadcast to the blockchain nodes 500 as designated.

That is, the broadcast of the transaction information for bitcoin payment is defined by a protocol, and if the transaction information for bitcoin payment occurs, one node of the blockchain nodes broadcasts initial transaction information for bitcoin payment to eight designated nodes, then each of the eight designated nodes that received the information broadcasts again to another eight designated nodes in a pyramidic fashion, and the broadcast is completed when the information is transmitted to all of the blockchain nodes 500 required for bitcoin payment.

Therefore, any transaction information including the aforementioned transaction information for registration of the public key as well as the transaction information for bitcoin payment cannot be tampered with, because they are stored in the blockchain comprised of more than 100,000 of the blockchain nodes 500.

Further, the blockchain of the blockchain nodes 500 may include private information as well as the transaction information for bitcoin payment, and the description is as follows, which will explain the reason that the transaction information for registration including the public key required for authentication of the user when the requested service is to be used, as the private information, can also be stored in the blockchain.

If the transaction information for bitcoin payment in which OP_RETURN information, i.e., Operation Code RETURN, is enclosed is transmitted, then each of the blockchain nodes 500 broadcasts the transaction information as private information, not as information representing a bitcoin payment, and an inclusion of the OP_RETURN information into the transaction information for registration plays a major role in encryption of information for authentication used for authentication of the user.

Herein, if the blockchain nodes 500 detect OP_RETURN information in the transaction information for bitcoin payment when authorizing the bitcoin payment, the blockchain nodes 500 may send a notification that the information with the OP_RETURN in it is used to represent an arbitrary data, not transaction information for bitcoin payment.

The service-providing server 300 may be a device that, if the user device 100 transmits a service request, encrypts the user-authenticating information which requests the authentication of the user, and transmits the encrypted user-authenticating information to the mobile device 200 of the user.

Herein, the user must be a member logged-in to the service-providing server 300 to request a service.

For this purpose, if the user connects to the service-providing server 300 by way of the user device 100 and registers personal information including a member ID and a password used when logging-in and a phone number of the mobile device 200, the service-providing server 300 may store the registered information in the customer information DB 311 to thereby allow the user to log-in to the service-providing server 300 using the member ID and the password.

In order to do so, the service-providing server 300 may include its DB part 310 having its customer information DB 311 which stores the phone number of the mobile device of the user, its user-authenticating information generator 320, its encrypting engine 330, and its message-sending part 340.

By these processes, the service-providing server 300 may instruct its user-authenticating information generator 320 to create the user-authenticating information which is a random value. Herein, the user-authenticating information includes numbers, characters, symbols, or any other combination of them.

Thereafter, the service-providing server 300 may instruct its encrypting engine 330 to acquire encrypted user-authenticating information by encrypting the user-authenticating information with the public key of the user.

Thereafter, the service-providing server 300 may instruct its message-sending part 340 to transmit the encrypted user-authenticating information to the mobile device 200 by referring to the phone number of the mobile device 200 owned or possessed by the user stored in the customer information DB 311.

Herein, if the message-sending part 340 is an SMS module, it may transmit the encrypted user-authenticating information in a form of a short message, i.e., an SMS message, and if it is a push-message module, then it may send as in a form of a push message. Herein, if the encrypted user-authenticating information is to be transmitted as a push message, the mobile device 200 must have a push application.

Meanwhile, the push application may be an application which provides a push service for sending notification or an event notice to the user, and it may include Google Android push message client, Apple IOS push message client, Kakako Talk, Skype and NateOn, etc. By these processes, the push application of the mobile device 200 may establish a TCP/IP (Transmission Control Protocol/Internet Protocol) connection with the service-providing server 300, and may receive the encrypted user-authenticating information as a push message from the service-providing server 300.

Thereafter, the mobile device 200 may instruct its decrypting engine 210 to acquire and output the user-authenticating information by decrypting the encrypted user-authenticating information with the private key stored in the memory 220, and may allow the user to confirm the outputted user-authenticating information.

If the user inputs the confirmed user-authenticating information by way of the user device 100, the user device 100 may transmit the inputted user-authenticating information to the service-providing server 300.

Thereafter, the service-providing server 300 may confirm the transmitted user-authenticating information, and may allow the requested service to be provided to the user device 100.

Herein, in one case, the service-providing server 300 may retrieve the public key from the customer information DB 311 if the public key is stored in the customer information DB 311, and in another case, may retrieve the public key whenever it is needed if the public key is stored in the blockchain to prevent its leakage or forgery by hacking via processes as follows.

That is, if the service request is received from the user device 100, the service-providing server 300 may acquire and transmit the user identification information on the user who requested the service, from the customer information DB 311 to the key server 400.

The key server 400 may retrieve the transaction ID for registration from the keyword DB 411 by referring to the transmitted user identification information, and may transmit the transaction ID for registration to the blockchain nodes 500.

Herein, the blockchain nodes 500, where the transaction ID for registration is transmitted to, may be designated in advance.

Thereafter, the blockchain nodes 500 may retrieve the transaction information for registration from the blockchain by referring to the transmitted transaction ID for registration, and may transmit the transaction information for registration to the key server 400.

The key server 400 may instruct its transaction-processing engine 420 to acquire the public key from the transmitted transaction information for registration and to transmit the public key to the service-providing server 300.

Processes of encrypting and transmitting the user-authenticating information by using the system for secure transmission of user-authenticating information configured as such are as follows.

First of all, the user may transmit the service request by connecting to the service-providing server 300 through a log-in process using the member ID and the password by way of the user device 100, at a step of S100.

Herein, if the service request is received from the user device 100, the service-providing server 300 may determine whether the user has provided the public key of the user before the service request, at a step of S110. Herein, whether the public key has been provided may be determined by confirming whether the transaction ID for registration of the public key of the user is present in the customer information DB 311.

If it is determined that the public key has not been provided in advance, the service-providing server 300 may transmit a generation request for generating the public key and the private key to the mobile device 200 by referring to the phone number stored in the customer information DB 311, at a step of S111. Herein, the service-providing server 300 may allow the mobile-exclusive app including the key-generating engine 230 and the decrypting engine 210 to be transmitted and installed on the mobile device 200, to thereby perform the generation request.

Thereafter, the mobile device 200 may instruct the key-generating engine 230 to generate the public key and the private key, to store the private key in the memory 220, and to transmit the public key to the service-providing server 300, at a step of S112.

The service-providing server 300 may transmit the private key and the user identification information on the user to the key server 400, at a step of S113.

If the private key and the user identification information are received from the service-providing server 300, the key server 400 may instruct its transaction-processing engine 420 to generate (i) the transaction information for registration including the received public key, and (ii) the transaction ID for registration used as a key value for searching the transaction information for registration, at a step of S114.

Thereafter, the key server 400 may transmit the transaction information for registration to the blockchain nodes 500 in order to register in the blockchain, and store the transaction ID for registration and the user identification information in the keyword DB 411, at a step of S115.

Thereafter, the blockchain nodes 500 may store the transmitted transaction information for registration in the blockchain, at a step of S116.

Then, if it is determined that the user has provided the public key of the user, the service-providing server 300 may instruct its user-authenticating information generator 320 to create the user-authenticating information which is a random value, at a step of S120.

Thereafter, the service-providing server 300 may instruct its encrypting engine 330 to acquire the encrypted user-authenticating information by encrypting the user-authenticating information with the public key of the user, at a step of S130.

Herein, acquisition of the public key is performed as follows.

If the service request is received from the user device 100, the service-providing server 300 may acquire and transmit the user identification information on the user who requested the service from the customer information DB 311 to the key server 400, at a step of S131.

The key server 400 may retrieve the transaction ID for registration from the keyword DB 411 by referring to the transmitted user identification information, and may transmit the transaction ID for registration to the blockchain nodes 500, at a step of S132.

The blockchain nodes 500 may retrieve the transaction information for registration from the blockchain by referring to the transmitted transaction ID for registration, and may transmit the transaction information for registration to the key server 400, at a step of S133.

The key server 400 may instruct its transaction-processing engine 420 to acquire the public key from the transmitted transaction information for registration and to transmit the public key to the service-providing server 300, at a step of S134.

Thereafter, the service-providing server 300 may instruct its message-sending part 340 to transmit the encrypted user-authenticating information to the mobile device 200 by referring to the phone number of the user stored in the customer information DB 311, at a step of S140.

If the encrypted user-authenticating information is received from the service-providing server 300, the mobile device 200 may instruct its decrypting engine 210 to acquire the user-authenticating information by decrypting the encrypted user-authenticating information with the private key of the user stored in the memory 220 and to output the user-authenticating information, at a step of S150.

If the user operates the user device 100 to confirm the user-authenticating information displayed on the mobile device 200, and to input the confirmed user-authenticating information, the user device 100 may transmit the inputted user-authenticating information to the service-providing server 300, at a step of S160.

The service-providing server 300 may confirm the transmitted user-authenticating information, and may allow the requested service to be provided to the user device 100, at a step of S170.

The present disclosure has an effect of preventing an unauthorized user from recognizing the authentication number using the encrypted authentication number which cannot be decrypted in case the encrypted authentication number is leaked due to hacking, by transmitting the authentication number encrypted with the public key of the user from the service-providing server to the mobile device of the user.

The present disclosure has another effect of preventing leakage or forgery of the public key of the user due to hacking in case the public key is maintained in a private server, by storing the public key required for encrypting the authentication number in the blockchain which is immune to forgery and falsification, not in the private server, and serving the public key only when needed.

What is claimed is:

1. A method for secure transmission of user-authenticating information, comprising steps of:
    (a) a service-providing server, in response to a service request for a service desired by a user being acquired from a user device, determining whether a public key of the user is registered in a blockchain network or supporting another device connected with the service-providing server to determine whether the public key of the user is registered in the blockchain network, and in response to the public key of the user being determined as registered in the blockchain network, instructing a user-authenticating information generator to generate user-authenticating information for reference, instructing an encrypting engine to encrypt the generated user-authenticating information for reference by using the public key of the user retrieved from the blockchain network, and instructing a message-sending part to transmit the encrypted user-authenticating information for reference to a mobile device of the user or supporting another device connected with the service-providing server to transmit the encrypted user-authenticating information for reference to the mobile device of the user; and
    (b) the service-providing server, in case that user-authenticating information for comparison is acquired from the user device, wherein the mobile device instructs a decrypting engine to decrypt the encrypted user-authenticating information for reference received from the service-providing server into decrypted information by using a private key of the user which has been stored beforehand, and displays the decrypted information, and then the user-authenticating information for comparison is inputted by the user via the user device after the user confirms the decrypted information displayed on the mobile device, and in response to the user-authenticating information for comparison being determined as identical to the user-authenticating information for reference, providing the user device with the service desired by the user who has sent the service request or supporting another device connected with the service-providing server to provide the user device with the service desired by the user who has sent the service request,
    wherein, at the step of (a), the service-providing server, in response to the public key of the user being determined as not registered in the blockchain network, transmits a generation request for the public key of the user to the mobile device of the user, to thereby allow the mobile device of the user to generate the private key of the user and its corresponding public key of the user by way of a key-generating engine, allows the private key of the user to store in the mobile device and the public key of the user to transmit to the service-providing server, and in response to the public key of the user being acquired from the mobile device of the user, transmits the public key of the user to at least one blockchain node included in the blockchain network, to thereby instruct the at least one blockchain node to register the public key of the user in the blockchain network, and acquires a transaction ID for registration corresponding to the public key of the user registered in the blockchain network, and wherein the service-providing server, in response to the public key of the user is-being acquired from the mobile device of the user, transmits the public key of the user and user identification information on the user to a key server, to thereby instruct the key server to (i) generate transaction information for registration to be used for registering the public key of the user in the blockchain network and its corresponding transaction ID for registration by way of a transaction-processing engine, (ii) match and manage the user identification information and the transaction ID for registration, and (iii) transmit the transaction information for registration to the at least one blockchain node, to thereby allow the transaction information for registration to register in the blockchain network.

2. A method for secure transmission of user-authenticating information, comprising steps of:

(a) a service-providing server, in response to a service request for a service desired by a user being acquired from a user device, determining whether a public key of the user is registered in a blockchain network or supporting another device connected with the service-providing server to determine whether the public key of the user is registered in the blockchain network, and in response to the public key of the user being determined as registered in the blockchain network, instructing a user-authenticating information generator to generate user-authenticating information for reference, instructing an encrypting engine to encrypt the generated user-authenticating information for reference by using the public key of the user retrieved from the blockchain network, and instructing a message-sending part to transmit the encrypted user-authenticating information for reference to a mobile device of the user or supporting another device connected with the service-providing server to transmit the encrypted user-authenticating information for reference to the mobile device of the user; and (b) the service-providing server, in case that user-authenticating information for comparison is acquired from the user device, wherein the mobile device instructs a decrypting engine to decrypt the encrypted user-authenticating information for reference received from the service-providing server into decrypted information by using a private key of the user which has been stored beforehand, and displays the decrypted information, and then the user-authenticating information for comparison is inputted by the user via the user device after the user confirms the decrypted information displayed on the mobile device, and in response to the user-authenticating information for comparison being determined as identical to the user-authenticating information for reference, providing the user device with the service desired by the user who has sent the service request or supporting another device connected with the service-providing server to provide the user device with the service desired by the user who has sent the service request, wherein, at the step of (a), the service-providing server transmits a key request for the public key of the user, using the transaction ID for registration corresponding to the public key of the user registered in the blockchain network, to the at least one blockchain node included in the blockchain network, to thereby instruct the at least one blockchain node to transmit the public key of the user, which is registered in the blockchain network as corresponding to the transaction ID for registration, to the service-providing server, wherein the service-providing server transmits the user identification information, as the key request for the public key of the user, to the key server, to thereby instruct the key server to (i) transmit the transaction ID for registration, which is managed according to the user identification information, to the at least one blockchain node, to thereby acquire the transaction information for registration corresponding to the transaction ID for registration, and (ii) transmit the public key of the user included in the transaction information for registration to the service-providing server.

3. The method of claim 1, wherein the user-authenticating information for reference includes numbers, characters, symbols, or any combination thereof.

4. The method of claim 1, wherein, at the step of (a), the service-providing server transmits the encrypted user-authenticating information for reference to the mobile device of the user by using a phone number corresponding to the user.

5. The method of claim 1, wherein, at the step of (a), the service-providing server determines whether the transaction ID for registration, acquired by registering the public key of the user in the blockchain network, is registered in a transaction database, to thereby determine whether the public key of the user is registered in the blockchain network.

6. A service-providing server for secure transmission of user-authenticating information, comprising:

at least one memory that stores instructions; and
at least one processor configured to execute the instructions to perform processes of: (I) in response to a service request for a service desired by a user being acquired from a user device, determining whether a public key of the user is registered in a blockchain network or supporting another device connected with the service-providing server to determine whether the public key of the user is registered in the blockchain network, and in response to the public key of the user being determined as registered in the blockchain network, instructing a user-authenticating information generator to generate user-authenticating information for reference, instructing an encrypting engine to encrypt the generated user-authenticating information for reference by using the public key of the user retrieved from the blockchain network, and instructing a message-sending part to transmit the encrypted user-authenticating information for reference to a mobile device of the user or supporting another device connected with the service-providing server to transmit the encrypted user-authenticating information for reference to the mobile device of the user, and (II) in case that user-authenticating information for comparison is acquired from the user device, wherein the mobile device instructs a decrypting engine to decrypt the encrypted user-authenticating information for reference received from the service-providing server into decrypted information by using a private key of the user which has been stored beforehand, and displays the decrypted information, and then the user-authenticating information for comparison is inputted by the user via the user device after the user confirms the decrypted information displayed on the mobile device, and in response to the user-authenticating information for comparison is-being determined as identical to the user-authenticating information for reference, providing the user device with the service desired by the user who has sent the service request or supporting another device connected with the service-providing server to provide the user device with the service desired by the user who has sent the service request, wherein, at the process of (I), the processor, in response to the public key of the user being determined as not registered in the blockchain network, transmits a generation request for the public key of the user to the mobile device of the user, to thereby allow the mobile device of the user to generate the private key of the user and its corresponding public key of the user by way of a key-generating engine, allows the private key of the user to store in the mobile device and the public key of the user to transmit to the service-providing server, and in response to the public key of the user is being acquired from the mobile device of the user, transmits the public key of the user to at least one blockchain node included in the blockchain network, to thereby instruct the at least one blockchain node to register the public key of the user in the blockchain network, and acquires a transaction ID for registration corresponding to the public key of the user registered in the blockchain network, wherein the processor, in response to the public key of the user being acquired from the mobile device of the user, transmits the public key of the user and user identification information on the user to a key server, to thereby instruct the key server to (i) generate transaction information for registration to be used for registering the public key of the user in the blockchain network and its corresponding transaction ID for registration by way of a transaction-processing engine, (ii) match and manage the user identification information and the transaction ID for registration, and (iii) transmit the transaction information for registration to the at least one blockchain node, to thereby allow the transaction information for registration to register in the blockchain network.

7. A service-providing server for secure transmission of user-authenticating information, comprising:
at least one memory that stores instructions; and
at least one processor configured to execute the instructions to perform processes of: (I) in response to a service request for a service desired by a user being acquired from a user device, determining whether a public key of the user is registered in a blockchain network or supporting another device connected with the service-providing server to determine whether the public key of the user is registered in the blockchain network, and in response to the public key of the user being determined as registered in the blockchain network, instructing a user-authenticating information generator to generate user-authenticating information for reference, instructing an encrypting engine to encrypt the generated user-authenticating information for reference by using the public key of the user retrieved from the blockchain network, and instructing a message-sending part to transmit the encrypted user-authenticating information for reference to a mobile device of the user or supporting another device connected with the service-providing server to transmit the encrypted user-authenticating information for reference to the mobile device of the user, and (II) in case that user-authenticating information for comparison is acquired from the user device, wherein the mobile device instructs a decrypting engine to decrypt the encrypted user-authenticating information for reference received from the service-providing server into decrypted information by using a private key of the user which has been stored beforehand, and displays the decrypted information, and then the user-authenticating information for comparison is inputted by the user via the user device after the user confirms the decrypted information displayed on the mobile device, and in response to the user-authenticating information for comparison being determined as identical to the user-authenticating information for reference, providing the user device with the service desired by the user who has sent the service request or supporting another device connected with the service-providing server to provide the user device with the service desired by the user who has sent the service request, wherein, at the process of (I), the processor transmits a key request for the public key of the user, using the transaction ID for registration corresponding to the public key of the user registered in the blockchain network, to the at least one blockchain node included in the blockchain network, to thereby instruct the at least one blockchain node to transmit the public key of the user, which is registered in the blockchain network as corresponding to the transaction ID for registration, to the service-providing server, wherein the processor transmits the user identification information, as the key request for the public key of the user, to the key server, to thereby instruct the key server to (i) transmit the transaction ID for registration, which is managed according to the user identification information, to the at least one blockchain node, to thereby acquire the transaction information for registration corresponding to the transaction ID for registration, and (ii) transmit the public key of the user included in the transaction information for registration to the service-providing server.

8. The service-providing server of claim 6, wherein the user-authenticating information for reference includes numbers, characters, symbols, or any combination thereof.

9. The service-providing server of claim 6, wherein, at the process of (I), the processor transmits the encrypted user-authenticating information for reference to the mobile device of the user by using a phone number corresponding to the user.

10. The service-providing server of claim 6, wherein, at the process of (I), the processor determines whether the transaction ID for registration, acquired by registering the public key of the user in the blockchain network, is registered in a transaction database, to thereby determine whether the public key of the user is registered in the blockchain network.

* * * * *